United States Patent
Buckingham et al.

(10) Patent No.: US 6,640,326 B1
(45) Date of Patent: Oct. 28, 2003

(54) DATA SET RECOVERY BY CODEWORD OVERLAY

(75) Inventors: Jonathan Peter Buckingham, Bristol (GB); Laura Loredo, Bristol (GB); Paul Frederick Bartlett, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 576 days.

(21) Appl. No.: 09/580,453

(22) Filed: May 30, 2000

(30) Foreign Application Priority Data

Jun. 28, 1999 (EP) .............................. 99305079

(51) Int. Cl.[7] .............................................. G11C 29/00
(52) U.S. Cl. ........................................ 714/769; 714/772
(58) Field of Search ........................... 714/2, 758, 774, 714/784, 769, 772; 365/127; 710/6

(56) References Cited

U.S. PATENT DOCUMENTS

| | | | | |
|---|---|---|---|---|
| 3,638,185 A | * | 1/1972 | Dell et al. ..................... | 714/2 |
| 3,657,707 A | * | 4/1972 | McFarland et al. .......... | 365/127 |
| 4,435,762 A | * | 3/1984 | Milligan et al. ............. | 710/6 |
| 5,251,077 A | | 10/1993 | Saitoh ......................... | 360/53 |
| 5,349,481 A | | 9/1994 | Kauffman et al. ........... | 360/74.4 |
| 5,467,361 A | | 11/1995 | Shipman, Jr. ............... | 371/40.1 |
| 5,719,717 A | | 2/1998 | Leonhardt et al. ........... | 360/48 |
| 5,991,911 A | * | 11/1999 | Zook ........................... | 714/758 |
| 6,272,659 B1 | * | 8/2001 | Zook ........................... | 714/774 |

* cited by examiner

*Primary Examiner*—David Ton (57) ABSTRACT

A method for recovering user data from a host device stored on a data storage medium where a said data may become corrupted during a read operation comprises: performing a read operation to read at least one encoded data fragment of said plurality of encoded data fragments from said data storage medium; storing status data indicating whether said at least one data fragment was correctly read; writing said read at least one data fragment to a buffer memory; attempting to decode said at least one encoded data fragment in said buffer memory wherein if said attempted decoding is unsuccessful then said method further comprises the steps of: re-reading incorrectly read encoded data fragments from said data storage medium; and attempting to decode said encoded data fragments located in said buffer memory.

34 Claims, 9 Drawing Sheets

Fig. 1

| Row within Sub Data Set | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| . | . | . | . | . | . | . | . | . | . | . | . | . | . | . | . | . |
| 61 | 976 | 977 | 978 | 979 | 980 | 981 | 982 | 983 | 984 | 985 | 986 | 987 | 988 | 989 | 990 | 991 |
| 62 | 992 | 993 | 994 | 995 | 996 | 997 | 998 | 999 | 1000 | 1001 | 1002 | 1003 | 1004 | 1005 | 1006 | 1007 |
| 63 | 1008 | 1009 | 1010 | 1011 | 1012 | 1013 | 1014 | 1015 | 1016 | 1017 | 1018 | 1019 | 1020 | 1021 | 1022 | 1023 |

Fig. 2

| C1 Parity | | 9 LSBs of the address | | Codeword Header & Status | |
|---|---|---|---|---|---|
| 468 | 469 | 478 | 479 | 480 | 511 |
| C1,468,0 | C1,400,1 | C1,478,0 | C1,470,1 | CCP0 | |
| C1,408,2 | C1,460,3 | C1,478,2 | C1,479,2 | CCP16 | |
| C1,408,106 | C1,409,107 | C1,478,106 | C1,470,107 | CCP848 | |
| C1,408,128 | C1,409,129 | C1,478,128 | C1,479,129 | CCP1 | |
| C1,408,234 | C1,409,236 | C1,478,274 | C1,479,834 | CCP849 | |
| C1,408,1020 | C1,409,1021 | C1,478,1020 | C1,479,1021 | CCP15 | |
| C1,408,2026 | C1,408,2027 | C1,478,2020 | C1,479,2079 | CCP863 | |
| C12,468,0 | C12,409,0 | C12,478,0 | C12,479,0 | CCP864 | |
| C12,408,9 | C12,469,9 | C12,478,9 | C12,479,9 | CCP1008 | |
| C12,468,10 | C12,409,110 | C12,478,10 | C12,479,10 | CCP865 | |
| C12,468,19 | C12,409,19 | C12,478,19 | C12,479,19 | CCP1009 | |
| C12,408,150 | C12,469,150 | C12,478,150 | C12,479,150 | CCP879 | |
| C12,408,159 | C12,409,150 | C12,478,159 | C12,479,159 | CCP1023 | |

Fig. 3

| Address 9 LSBs | | | | | | |
|---|---|---|---|---|---|---|
| 480:489 | 490:493 | 494 | 495 | 496:499 | 500:507 | 508:511 |
| CCP Header Data | | Unused | | | | Unused |

| 480 | 481 | 482 | 483 | 484 | 485 | 486 | 487 | 488 | 489 |
|---|---|---|---|---|---|---|---|---|---|
| Codeword ID | | Write Pass | | | | A.C.N. | | CRC1 | CRC0 |
| (7:0) | (15:8) | (7:0) | (15:8) | (23:16) | (31:24) | (7:0) | (15:8) | (7:0) | (7:0) |

| | |
|---|---|
| Description: | Do a read retry on a Data Set already in the Buffer. |
| Inputs: | Direction: Towards EOD/BOD<br>Start Data Set ID:<br>Correction Sequence:<br>Start Data Set Index:<br><br>Sub dataset mask: Indicates which sub datasets should *not* be overwritten in the Buffer. |
| Outputs: | |
| Uses and/or Changes: | |
| Assumes: | *Start Data Set index* is already locked to Physical Pipeline in *Logical Media*. |
| Results: | *Physical Formatter* read pipeline is in *reading* mode, with Num of Datasets limited to 1, and *Read Through Errors* set to *Stop on Error*<br>*Physical Formatter* will not overwrite masked sub datasets for the Start Data Set.<br>*Physical Formatter* will also preserve the CCP status RAM in *read chain controller* for other sub datasets. In this way any CCPs which have been previously read with good quality can be preserved. |
| Errors: | If requested mode combination is illegal then *Formatter Status* is invoked to inform Physical Pipeline Control, *and mode is unchanged*. |

DATA SET RECOVERY BY CODEWORD OVERLAY

FIELD OF THE INVENTION

The present invention relates to data storage devices and in particular although not exclusively to a method for recovering data written onto a data storage medium as a plurality of encoded data fragments.

BACKGROUND TO THE INVENTION

In data storage devices it is known to store data from host devices, e.g. a computer, onto a data storage medium such as a magnetic tape in order to protect data stored on the computer from accidental erasure and the like. An operation to write user data to a data storage medium is also known herein as performing a "back-up" operation. In conventional data back-up systems comprising a data storage device and data storage medium it is known to use encryption techniques to encode user data to enable it to be recovered in the event of errors occurring during a write operation to write user data to a data storage medium or during a read operation to read data written onto a data storage medium.

Data storage media for data back-up may comprise a magnetic tape data storage medium, wherein an elongate tape is drawn past a substantially stationary or rotating read/write magnetic head assembly. Data being encoded onto the data storage medium as a sequence of magnetization reversals in a particulate magnetic coating as is known.

Redundancy encryption methods for encoding redundant information into data can be used to reconstruct complete data sets in the event of portions of the data set being lost or corrupted during, for example, writing to or reading from a data storage medium. However, for any redundancy encryption scheme there is a limit on the total number of bytes of digital data that can be recovered from a data set of specified length.

After a complete data set has been successfully written to a data storage medium, then during a subsequent read operation to restore data from the data storage medium corruption of the data can occur; If the data storage medium is a elongate magnetic tape, then during a read operation there are numerous mechanisms by which data being retrieved from a magnetic tape may become corrupted. Among the mechanisms for corrupting data during a read operation are:

Defects in the data storage medium;

A build up of tape oxide on the read head producing a temporary loss of contact between the data storage medium and the read head resulting in a weak or corrupted signal being read;

Electrical noise or interference inducing spurious signals in the read chain electronics.

Prior art methods for data recovery include, in a data storage device having a plurality of read/write heads mounted on a rotating drum angled such that the plurality of read heads trace out a sequence of elongate magnetic tracks diagonally across a magnetic tape data storage medium, there is provided a facility for re-reading entire physical tracks in the event of data being corrupted during a read operation. Re-reading an entire physical track in order to recover corrupt data may significantly slow down the recovery of data from a data storage mediun in the event of there being a large amount of corrupted or incorrectly read data.

In order to improve the successful and reliable operation of data storage devices, in particular tape data storage devices, it is important to develop improved methods for recovering corrupted or incorrectly read data being read from a data storage medium.

SUMMARY OF THE INVENTION

Specific embodiments and methods according to the present invention aim to improve the recovery of corrupted or otherwise incorrectly read data in high data storage density systems, and thereby improve the operation of such devices.

According to a first aspect of the present invention, there is provided a method for recovering data written onto a data storage medium as a plurality of encoded data fragments said method comprising the steps of:

performing a first read operation to read at least one encoded data fragment of said plurality of encoded data fragments from said data storage medium;

storing a first status data indicating whether said at least one data fragment has been correctly read;

if said at least one data fragment is correctly read, writing said at least one read data fragment to a buffer memory;

attempting to decode said at least one encoded data fragment in said buffer memory;

if said attempted decoding is unsuccessful, performing a second read operation for re-reading said at least one encoded data fragment from said data storage medium; and attempting to decode said re-read encoded data fragment.

Suitably, in said step of writing said at least one data fragment to buffer memory, only said data fragments for which a header data is successfully recovered are written into said buffer memory. Data fragments which are incorrectly read in said first read operation are suitably not read to said buffer memory. Suitably, the status data indicates that a C1 codeword pair has been read and identifies a number of corrupted bytes of data corrected by a C1 decoding algorithm.

Said step of re-reading said at least one incorrectly read encoded data fragment may comprise repositioning a read head at one end of a data set containing at least one incorrectly read encoded data fragment to be re-read and re-reading said data set by traversing said read head between first and second ends of said data set.

Preferably, redundancy coding data is used in said at least one data fragment to enable confirmation that a header field data has been correctly read during a said read operation.

Preferably the method further comprises the steps of generating a second status data indicating whether said at least one data fragment is correctly read during said second read operation, comparing said second status data with said first status data to determine whether the re-read said at least one data fragment has fewer error bytes than corresponding respective said data fragments stored in said buffer memory and if said re-read at least one data fragment has fewer error bytes than said stored data fragment, storing said re-read data fragment in said buffer memory.

Said step of storing said re-read data fragment preferably comprises overwriting an initial stored data fragment from a first read operation with a re-read data fragment from a second read operation.

If a data fragment is read during a said second read operation which has a header identifier data which is not the same as a header identifier data of a said data fragment already written to said buffer memory in said first read operation, said data fragment read in said second read operation may be written to a location in said buffer memory determined by said header identifier data.

Preferably said step of attempting to decode said at least one encoded data fragment in said buffer memory comprises applying a redundancy decoding algorithm to said at least one encoded data fragment in said buffer memory.

Preferably said plurality of encoded data fragments are stored in said buffer memory as a plurality of sub-data sets, said plurality of sub data sets comprising a data set. An encoded data fragment comprises a codeword pair.

According to a second aspect of the present invention there is provided a data storage device configurable to read at least one encoded data fragment from a data storage medium, characterized by comprising:

a means for reading said encoded data fragments from said data storage medium;

a means for applying at least one decoding algorithm to said encoded data fragments;

a first memory means configurable to store status data concerning decoding quality metrics of said encoded data fragments; and a second memory area configurable to store decoded said data fragments.

Preferably a said reading means comprises:

a transducer configurable to convert data written onto said data storage medium into electronic signals; and a means for recovering data from said read data fragments indicating a logical position of said at least one read fragment within said plurality of fragments.

Preferably said means for applying at first redundancy decoding algorithm is configurable to apply first and second Reed-Solomon redundancy decoding algorithms.

According to a third aspect of the present invention there is provided a method for recovering a data set written to a data storage medium as a first plurality of encoded data fragments said method comprising the steps of:

performing a read operation of said data set to read at least one of said plurality of encoded data fragments comprising said data set;

storing said read at least one data fragment in an area of a buffer memory reserved for storing data fragments of said data set;

storing in a memory device a quality metric data of said read operation of said at least one data fragment;

decoding said data set comprising said plurality of fragments stored within said buffer memory; and if said step of decoding said data set within said buffer memory fails, performing a re-read operation to reread incorrectly read data fragments of said data set from said data storage medium.

Preferably said at least one encoded data fragment is a redundancy encoded codeword pair. A said data set preferably comprises a plurality of error correction code redundancy coded sub data sets.

Preferably said step of decoding said data set within said buffer memory comprises:

applying an error correction code redundancy decoding algorithm to each sub data set of a plurality of sub data sets comprising a said a data set; and storing within a memory device, location data indicating which sub data sets of said plurality of sub data sets have been successfully decoded.

In the best mode, said error correction code redundancy decoding algorithm is a Reed-Solomon redundancy decoding algorithm. Preferably said step of performing a re-read operation comprises re-reading at least one incorrectly read data fragment, and overwriting said at least one re-read data fragment over corresponding respective earlier versions of at least one said data fragment stored in said buffer memory.

Preferably the method further comprising the step of: storing a location data describing memory locations of a plurality of correctly decoded sub data sets comprising said data set, wherein said correctly decoded sub data sets are preserved from overwrite in said buffer memory.

Preferably the method further comprises repeating said re-read operation on said data set a predetermined number of times, such that correctly read versions of data fragments are overwritten over stored data fragments having errors, until a C2 redundancy decoding algorithm can function for decoding said complete data set.

The invention includes a method of recovering data written onto a data storage medium as a plurality of encoded data fragments, said method comprising the steps of:

reading from said data storage medium a data set comprising a plurality of codeword pairs;

checking a header parity data of each said codeword pair;

for individual said codeword pairs, decoding C1 redundancy encoding data from said codeword pair, and using said C1 redundancy data to correct one or a plurality of incorrectly read said codeword pairs;

storing a first status data indicating a number of corrupted bytes of data corrected by said C1 redundancy coding;

applying a second redundancy decoding algorithm for decoding C2 redundancy data of a plurality of sub-data sets within said data set;

using said C2 redundancy encoded data to reconstruct missing or corrupted bytes of data in said data set; and if said C2 correction fails to fully correct said data set, then re-reading from said data storage medium individual codeword pairs from said data set.

Said step of re-reading individual codeword pairs may comprise reading said status data indicating whether a codeword pair was recovered and indicating a number of bytes in error in said codeword pair; and if said re-read codeword pair has fewer bytes in error than said same codeword pair originally stored within said memory resulting from said earlier read operation, then overwriting said earlier codeword pair with said re-read codeword pair.

Said step of re-reading said individual codeword pairs may be repeated. Data indicating whether or not a codeword pair has been successfully read from tape and C1 decoded may be stored as a second status data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

The specific methods according to the present invention as described herein are aimed at data storage devices configurable to store digital data from a host device such as a computer etc. In particular, the specific methods described herein relate to data storage devices such as magnetic tape data storage devices in which data read back from the data storage medium may become corrupted due to environmental factors such as dust, electrical interference and the like.

According to a specific implementation of the present invention described herein, data storage and retrieval occurs by winding an elongate tape between a first reel and a second reel whilst said elongate tape is substantially in contact with a magnetic read and/or write head assembly. According to the best mode described herein, the read/write head assemblies are substantially stationary and both writing data to the data storage medium and reading data from the data storage medium can occur with the elongate tape being wound in both a forward direction and a reverse direction.

It will be understood by those skilled in the art that the methods and apparatus disclosed herein are not limited to data storage devices having substantially stationary read and/or write heads reading data from and writing data to a data storage medium comprising an elongate magnetic tape.

Figure 1:
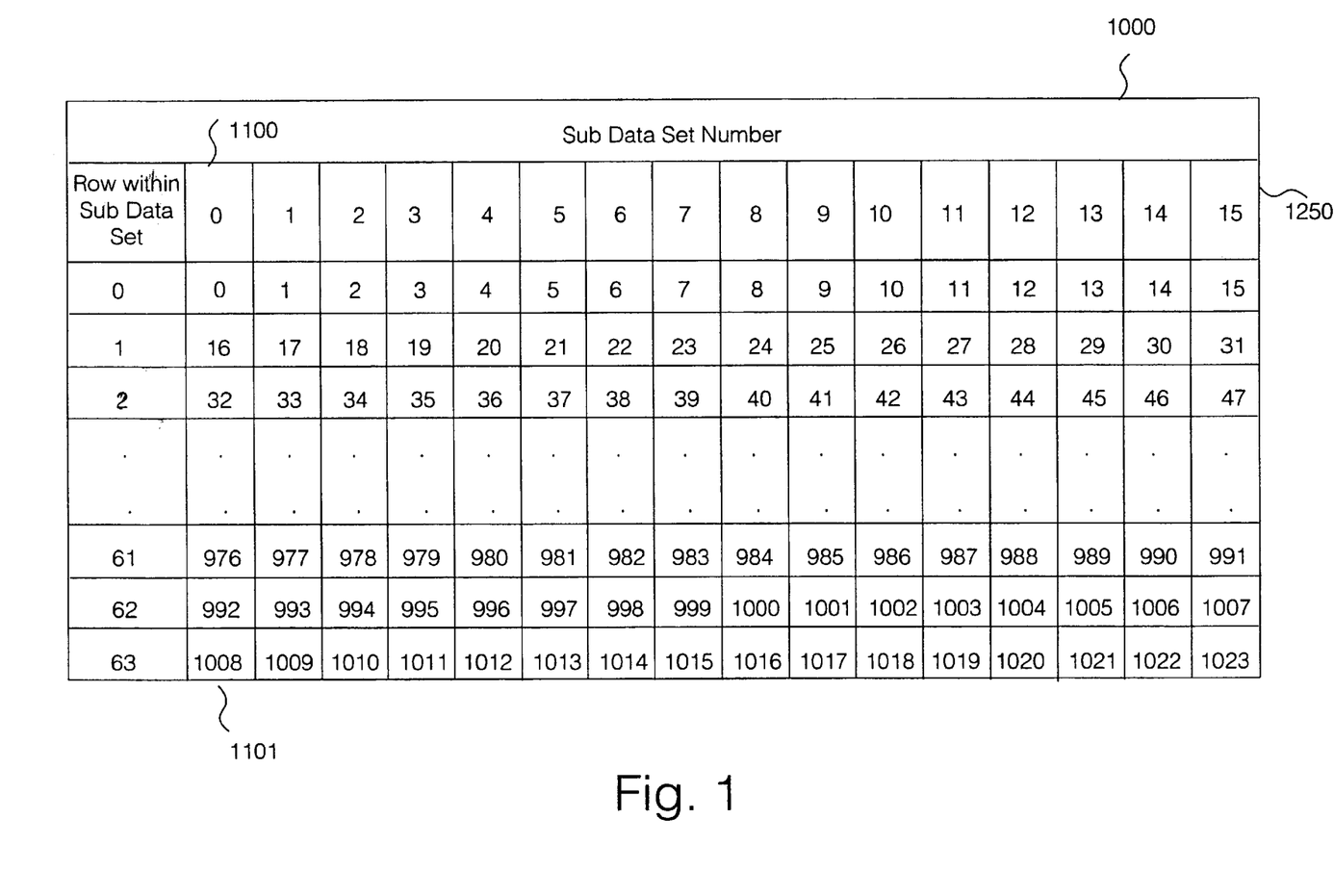
FIG. 1 illustrates schematically a redundancy encoded user data set comprising 491520 bytes of data segregated into 16 redundancy encoded sub data sets comprising 1024 codeword pairs according to a specific implementation of a present invention.

Referring to FIG. 1 herein, there is illustrated schematically a logical layout of data stored within a memory means such as a random access memory (RAM). The data logically arranged within the RAM as indicated in FIG. 1 comprises a single data set of user data. During a write operation to write a stream of digital data onto a data storage medium, according to the best mode described herein, a stream of data are partitioned into a plurality of data sets. Each data set 1000 comprises 404352 bytes of user data. Each data set 1000 is further sub divided into 1024 encoded data fragments which are also known herein as codeword pairs which are arranged logically within a memory device as 16 columns of sub data sets 1100–1250. Each column comprising a sub data set is further comprised of 64 encoded data fragments 1101.

In order to correct for corrupted data where such corruption may be caused by, for example, elongate scratches in the magnetic medium user data are encoded with redundancy information. Should data fragments become corrupted during a read or write process then the data may be recovered using the redundancy information.

According to the best mode presented herein, a first redundancy coding algorithm which is also known herein as C1 redundancy coding is applied to a sub data set of user data being logically organized as a 54×468 byte matrix. The first redundancy coding algorithm is applied to 234 even numbered bytes in each row of an encoded sub data set. Preferably, the first redundancy encoding algorithm providing the C1 redundancy coding is a (240, 234, 7) Reed-Solomon code which generates 6 bytes of encoding information. A same Reed-Solomon code is then applied to a remaining 234 odd numbered bytes within each row of the unencoded sub data set yielding a further 6 bytes of C1 redundancy encoding information. Hence, each row of each encoded sub data set 1100–1250 comprises 1 interleaved pair of codewords which is also known herein as a C1 codeword pair (CCP). Even numbered bytes of a first row of an encoded sub data set comprise a first codeword of the codeword pair and corresponding odd numbered bytes form a second codeword of the codeword pair of a first row of an encoded sub data set. In a similar fashion, a second C1 codeword pair is formed from encoding odd and even numbered bytes of a second row of a sub data set. This yields 54 C1 codeword pairs per sub data set. Each codeword pair having an encoded length of 480 bytes.

A second level of redundancy encoding of user data and C1 redundancy encoding information is performed on the 16 encoded sub data sets. A second redundancy recording algorithm is applied to each 54 byte column of C1 encoded codeword pairs. Preferably, the second redundancy encoding algorithm applied to both the user data and C1 redundancy information is a (64, 54, 11) Reed-Solomon redundancy encoding algorithm. The second redundancy encoding algorithm adds a further 10 bytes of a redundancy coding information, which is also known herein as C2 redundancy information.

Figure 2:
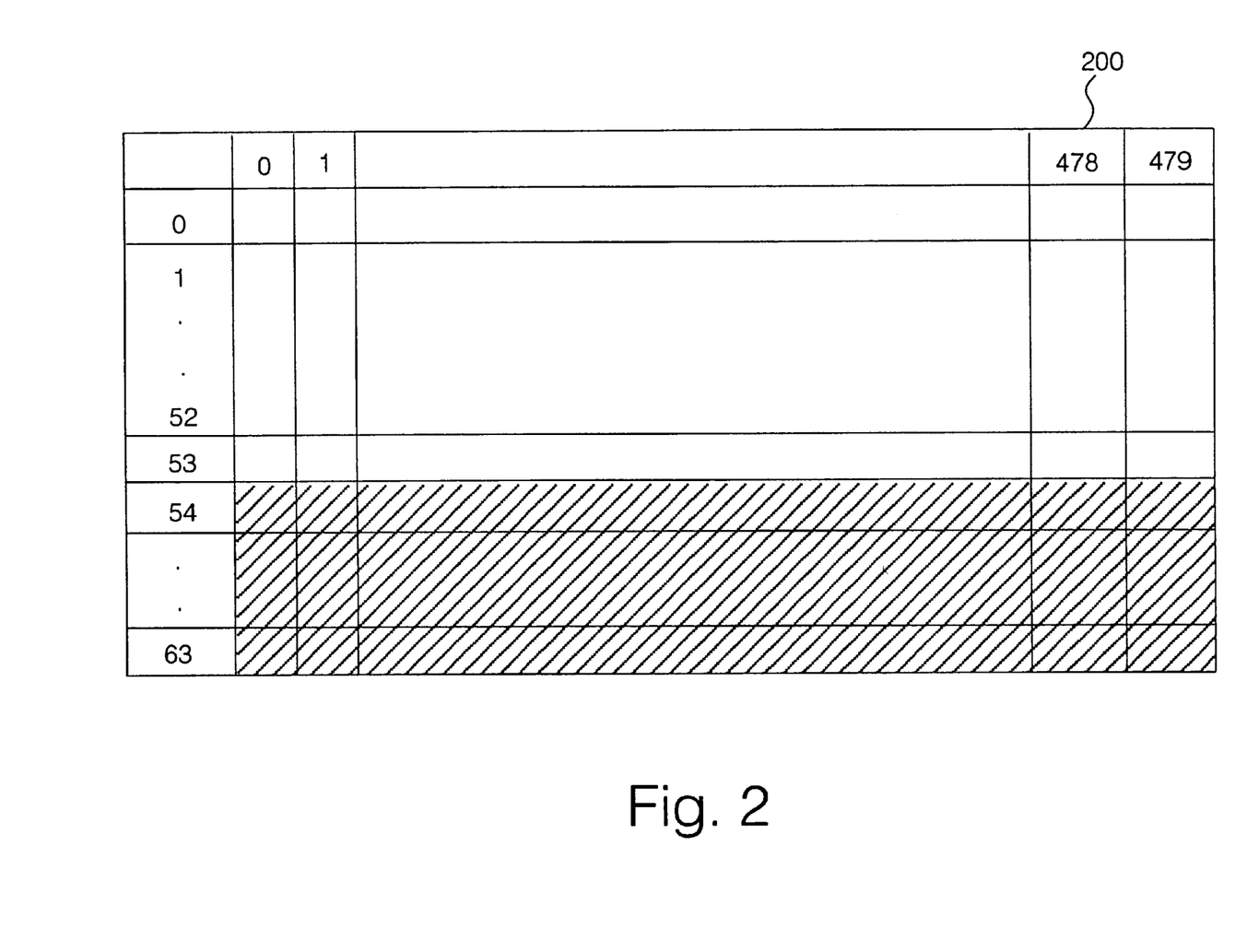
FIG. 2 illustrates schematically in more detail the redundancy encoded user data comprising a single sub data set according to a specific implementation of the present invention.

Referring to FIG. 2 herein there is illustrated schematically a logical layout of a single encoded sub data set as described herein before. FIG. 2 is a more detailed view of a single sub data set of the 16 sub data sets comprising a data set as illustrated in FIG. 1. Each sub data set 200 comprises 64 rows of user data blocks encoded with a first redundancy encoding algorithm as described herein before. A first 54 contiguously numbered rows 0 . . . 53 each comprises 468 bytes of user data and a corresponding respective 12 bytes of C1 redundancy information. Rows 54 to 63 inclusive comprise redundancy information derived using a second redundancy coding algorithm as described herein before. A corresponding respective first byte, which is the element in column 0 row 54 in FIG. 2, is a first byte of C2 redundancy information calculated by applying said second redundancy coding algorithm to said bytes numbered 0–53 inclusive in said zeroth column of FIG. 2. In a similar fashion, said $55^{th}$–$63^{rd}$ bytes of said $0^{th}$ column are calculated by using said algorithm applied to said $0^{th}$ to $53^{rd}$ bytes of said $0^{th}$ column in FIG. 2. The $54^{th}$–$63^{rd}$ bytes of the first column illustrated in FIG. 2 are, in a similar fashion, calculated using said second redundancy encoding algorithm applied to said $0^{th}$–$53^{rd}$ bytes of said first column. In a corresponding fashion, bytes numbered 54–63 of a second column in FIG. 2 are calculated by applying the second redundancy encoding algorithm to the $0^{th}$–$53^{rd}$ bytes of the second column in the logical array of data illustrated in FIG. 2. The $54^{th}$–$63^{rd}$ bytes of each subsequent column illustrated in FIG. 2 are calculated by applying the second redundancy encoding algorithm to the corresponding respective $0_{th}$–$53^{rd}$ bytes of each column.

In order to reassemble a data set in a correct order after a read operation from a data storage medium it is important to be able to identify a logical position of a codeword pair 1101 within a data set. Codeword pairs are identified by assigning a corresponding respective unique integer number to each codeword pair in a data set dependent upon a logical position of the codeword pair within a given row and column of that data set. By way of example, a codeword pair occupying a zeroth row and zeroth column within the logical array of the data set, is accorded an identifying integer 0. The integer number used to assign a logical position of a codeword pair within a data set is known herein as a "codeword pair designation". A logical position of a codeword pair within a data set 1000 is stored within a header field associated with each codeword pair.

Figure 3:
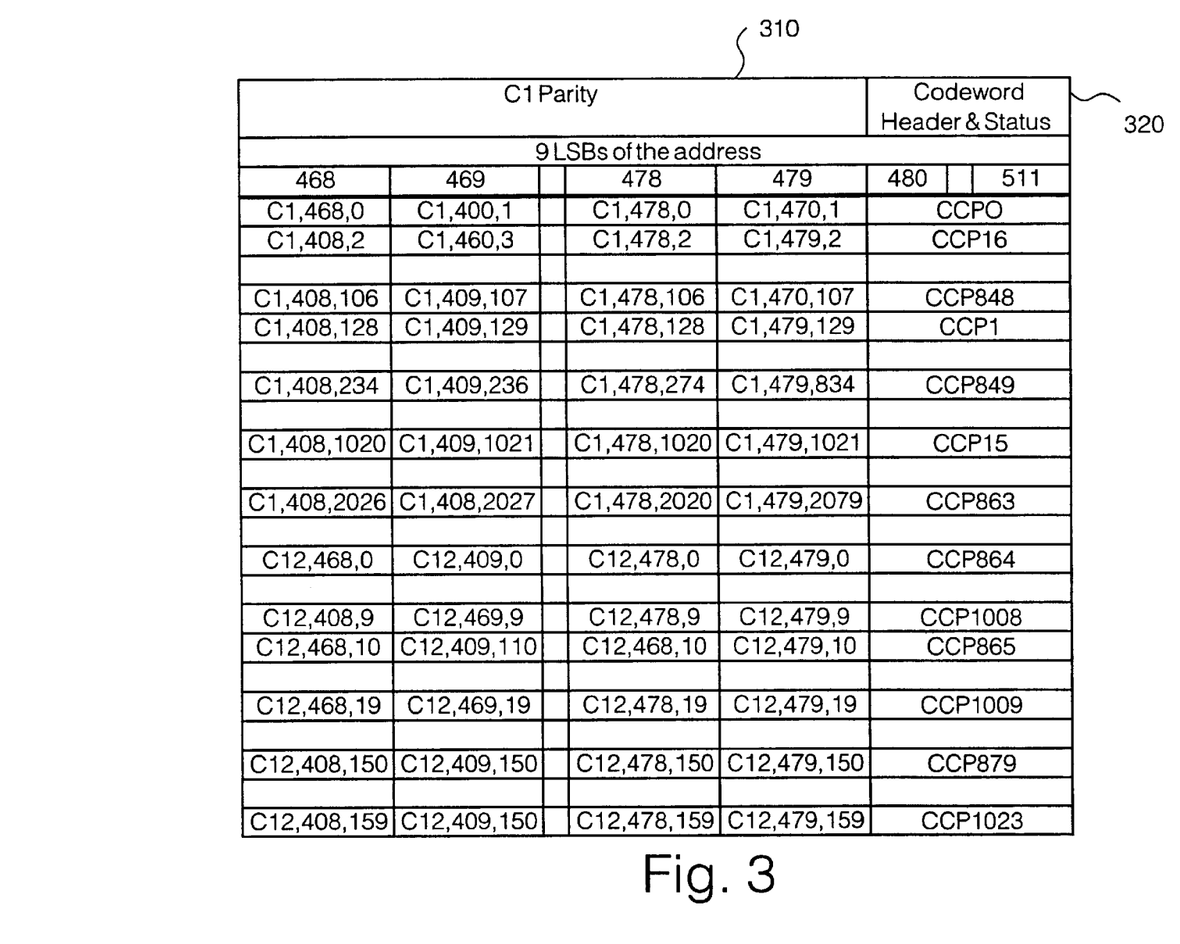
FIG. 3 illustrates schematically the relationship and organization of user data, redundancy coding information and codeword identification information according to a redundancy encoded data set according to a specific implementation of the present invention.

Referring to FIG. 3 herein, there is illustrated schematically a relationship and organization of C1 redundancy encoding information and the corresponding respective header for each codeword pair within the data set.

Codeword header includes an integer number identifying a position of a codeword pair within a data set as described herein before. The codeword header is 32 bytes in length. As referred to herein, a byte is an ordered set of 8 bits of digital information that are acted on as a unit. According to the best mode presented herein, for bytes containing 8 bits of digital information, bit 0 is the least significant bit and bit 7 is the most significant. Bytes 480 to 511 inclusive which contain codeword header information concerning the codeword pairs within a data set are not encoded using either the first or second redundancy encoding algorithms as described herein before. However, the codeword headers do contain error checking data distinct from the redundancy encoding applied to the user data and C1 redundancy coding data which is used to ensure that the header and a status data are correctly read back during a read operation.

Figure 4:
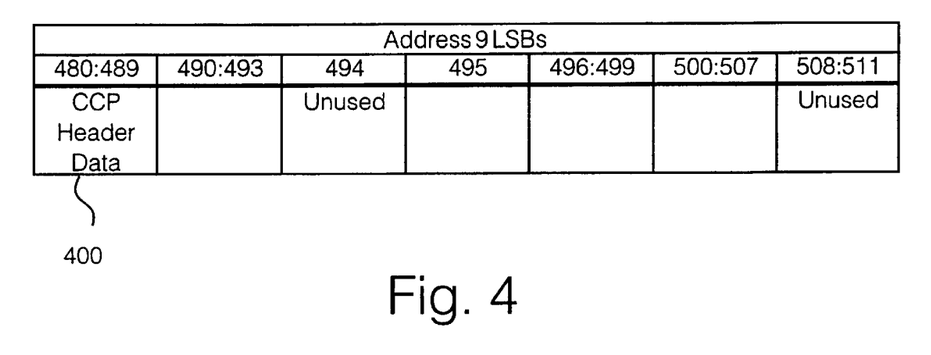
FIG. 4 illustrates schematically the organization within memory of a redundancy encoded codeword pair header and status bytes according to a specific implementation of the present invention.

Referring to FIG. 4 herein, there is illustrated in more detail the 32 bytes of data allocated to storing codeword header data as discussed herein before.

Bytes 480–489 inclusive are used to store codeword pair header data which includes data concerning a logical position of a codeword pair within a data set. Referring to Table 1 herein there is described, in more detail, a composition of CCP header data 400.

TABLE 1

| Byte positions | Length in bytes | Name of the field |
| --- | --- | --- |
| 0 | 2 | Codeword Identifier |
| 2 | 4 | Write Pass |
| 6 | 2 | CQ Sequence Number |
| 8 | 2 | Header Parity |

According to the best mode presented herein, the codeword identifier field uniquely identifies a codeword pair within a data set. The codeword identifier field may preferably comprise the following four sub-fields:

Bits 0–9 represent the integer numbers 0–1023 and are used to identify a position of a codeword pair within a data set as illustrated in FIG. 1 herein;

Bit 10 is set to 0;

Bit 11 is set to 0 for a codeword pair containing either user data, C1 or C2 redundancy encoding data;

Bits 12–15 are used to contain the four least significant bits of a number identifying an absolute position of a data set on a data storage medium. Since a memory device may have sufficient capacity in order to store more than one data set following a read operation it is necessary to be able to identify which data set within a plurality of data sets within a memory device a codeword pair corresponds to. While each data set has a unique data set number on a data storage medium, according to the best mode presented herein, bits 12–15 of the codeword identifier only contain the four least significant bits of the Data Set Number. Hence, it is possible to distinguish up to 16 different data sets within a memory device.

Figure 5:
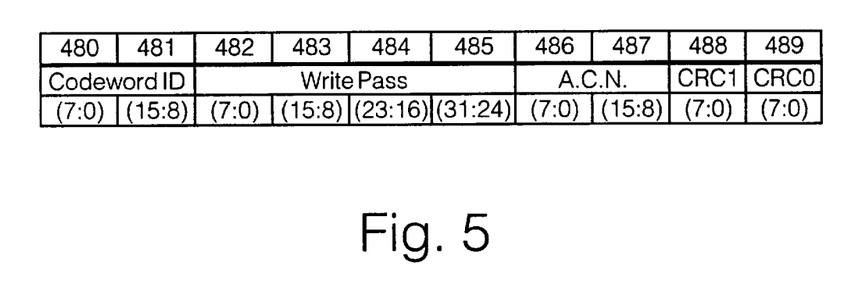
FIG. 5 illustrates schematically, in more detail, a redundancy encoded codeword pair header data according to a specific implementation of the present invention.

Referring to FIG. 5 herein, there is illustrated schematically in more detail, the allocation of bytes within CCP header data field 400. The codeword identifier bytes are bytes numbered 480 and 481 and the redundancy data used to check that a codeword header 400 has been correctly read from data storage medium are stored in bytes 488 and 489.

During a read operation to read at least one redundancy encoded data set from said data storage medium individual codeword pairs are read from the data storage medium and checked prior to storing in a memory device. The checking comprises using redundancy coding data encoded in the CCP header data 400 to confirm that the data contained within the header field has been correctly recovered during a read operation.

Figure 6:
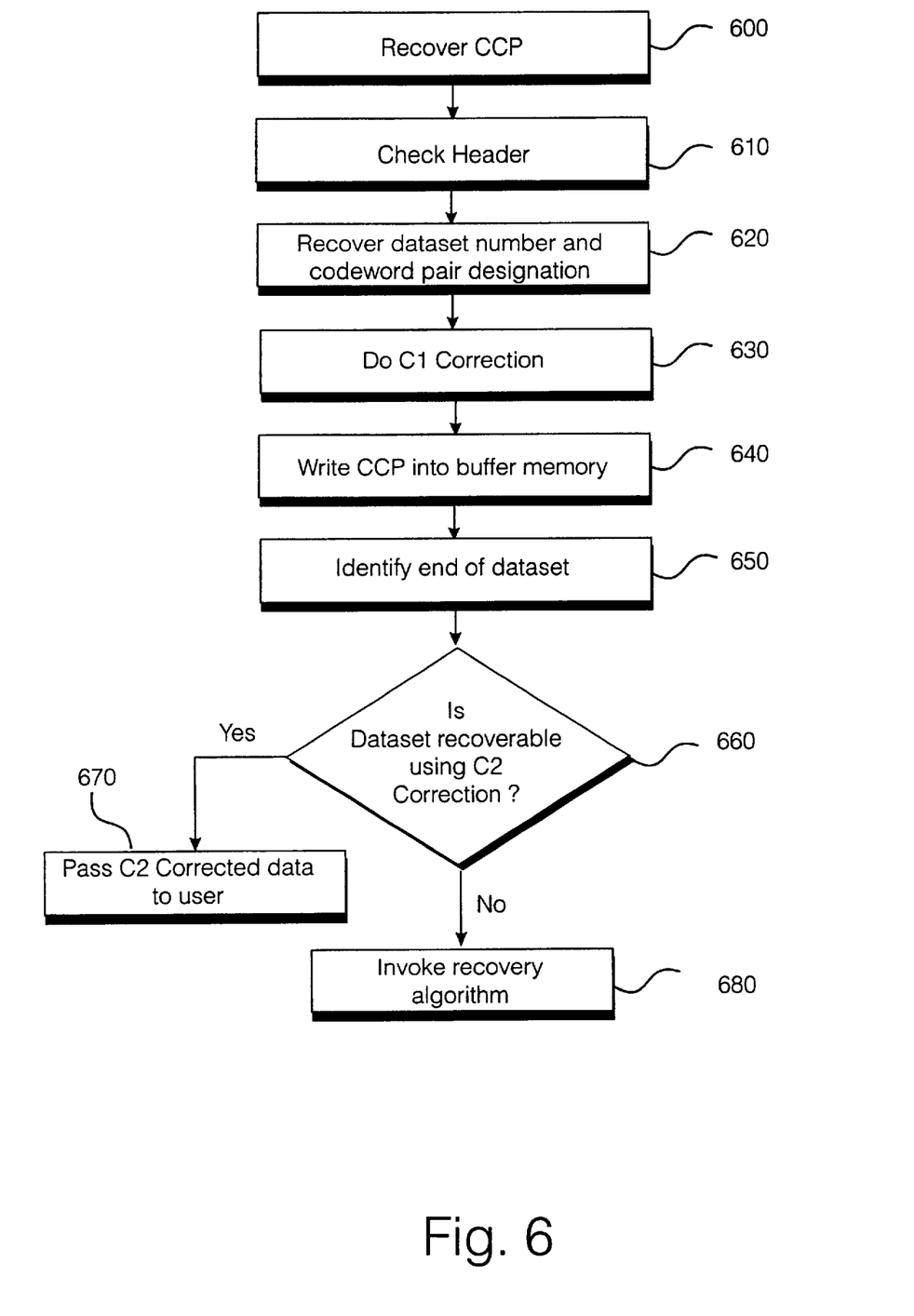
FIG. 6 illustrates schematically a block diagram summarizing the steps involved in reading and correcting for corrupted codewords pairs according to a specific method of the present invention.

Referring to FIG. 6 herein, there is illustrated schematically steps involved in recovering codeword pairs comprising at least one data set during a read operation in a normal mode of operation of a data storage device according to the best mode presented herein. In step 600, at least one codeword pair (CCP) is read from a data storage medium during a read operation, where the read operation may comprise a pass of a data storage medium containing tracks of written data past a read head of a data storage device. In step 610, the header parity data contained within the bytes 488–489 of the CCP header data 400 are checked to confirm that the header has been correctly recovered from the data storage medium and hence the corresponding codeword pair may be correctly identified. Preferably, the header redundancy data, which is also known herein as header parity data, is generated using a Reed-Solomon redundancy coding algorithm. If the data concerning a recovered codeword pair has been correctly read from the data storage medium then, in step 620, a codeword pair designation, which is also known herein as codeword pair identifier, locating a logical position of a codeword pair within a data set is recovered from CCP header data 400. Preferably, the codeword pair designation is an integer number in the range 0–1023. In step 630, the first redundancy decoding algorithm is applied to C1 redundancy encoded codeword pairs successfully read on the data storage medium. Redundancy encoding of individual codeword pairs, also known herein as C1 redundancy encoding, is used to correct for corrupted or otherwise incorrectly read bytes of data within a corresponding respective codeword pair. Each codeword pair for which CCP data header 400 was successfully recovered is written into a buffer memory in step 640. In addition, in a region of memory within the data storage device which may be separate from the buffer memory or comprise a part or parts of the buffer memory is configured to store a status data indicating that a C1 codeword pair has been read and also a number of corrupted bytes of data corrected by the C1 redundancy decoding algorithm. In step 650, a last codeword pair of the plurality of codeword pairs comprising a single data set is identified and decoding of the data set stored within the buffer memory can proceed. Preferably, the decoding of redundancy encoded data is performed by a processor operating according to a set of instructions stored on a memory device which may be a read only memory or a random access memory. In step 660, the second redundancy decoding algorithm is applied to the data set stored within the memory buffer. C2 redundancy encoding is applied to each column comprising 54 bytes of user data, or C1 redundancy data, as illustrated in FIG. 2 herein. Each column of the sub data set illustrated in FIG. 2 has a corresponding respective 10 bytes of C2 redundancy encoding data appended onto it. During the C2 redundancy decoding of encoded sub data sets the C2 redundancy encoding bytes of data are used to reconstruct missing or corrupted bytes of data in each corresponding respective column of a plurality of sub data sets comprising a data set. If there are more missing or corrupted bytes of data within a column than can be recovered using the C2 redundancy data then the entire sub data set containing the missing codeword pairs is not considered to be complete. If each sub data set of the plurality of sub data sets comprising a data set is complete then, in step 670, the complete C1 and C2 corrected data set is passed to the user and steps 600 to 660 inclusive in FIG. 6 are repeated for a next data set stored on the data storage medium. However, if at least one sub data set of the plurality of sub data sets comprising a data set contains more corrupted or missing codeword pairs than can recovered using the C2 redundancy decoding algorithm and corresponding respective C2 redundancy encoding data then, in step 680, a recovery algorithm is invoked to re-read missing codeword pairs from the data set.

Figure 7:
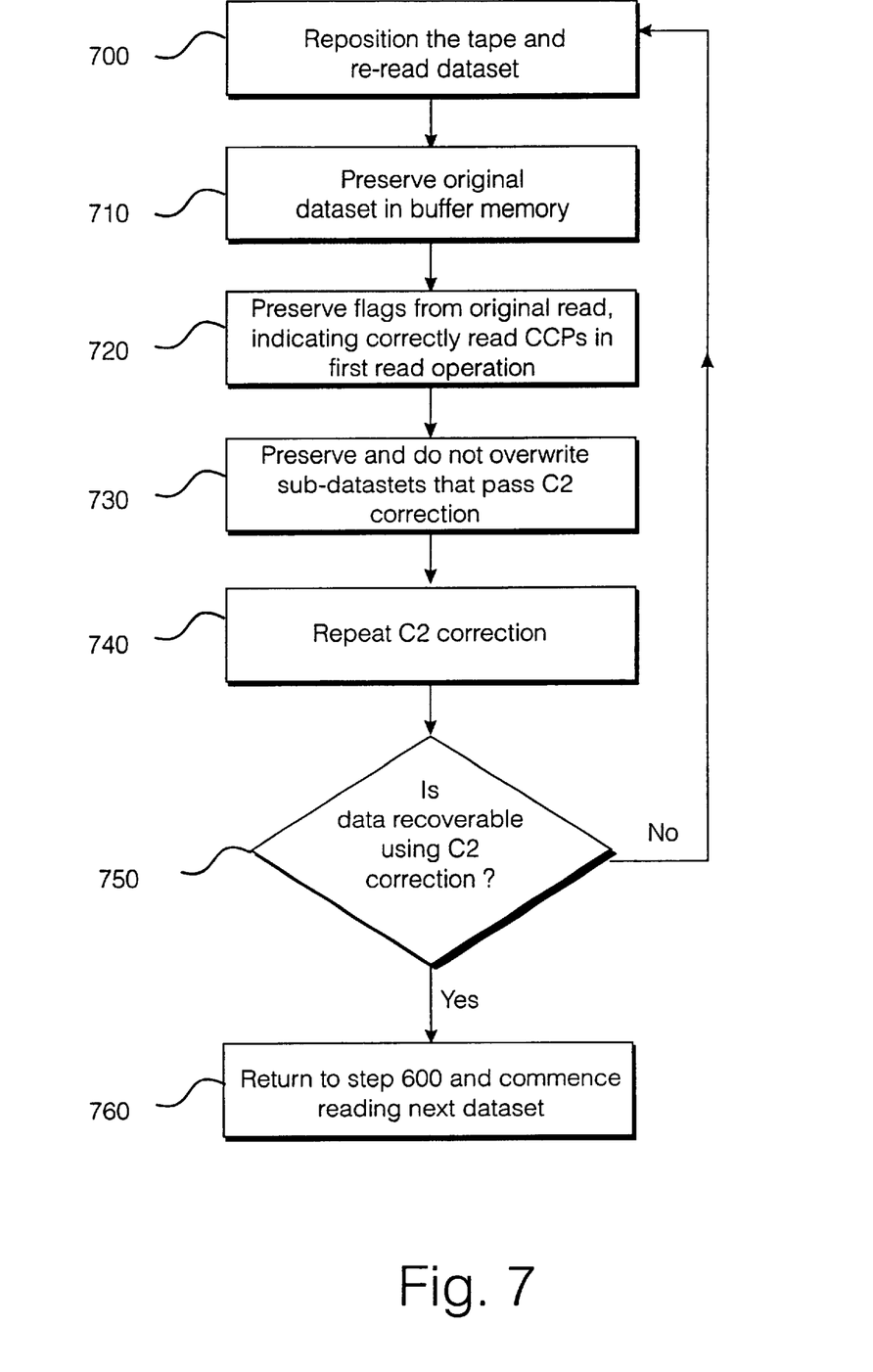
FIG. 7 illustrates schematically an algorithm for preserving correctly decoded sub data sets and replacing corrupted codeword pairs during a read operation according to a specific method of the present invention.

Referring to FIG. 7 herein, there is illustrated schematically a recovery algorithm for recovering corrupted or otherwise incomplete codeword pairs read from a data storage medium. If, during a first read operation, a complete data set cannot be recovered because, for example, there are more missing or incomplete codeword pairs than can be corrected for using the C1 and C2 ECC redundancy encoding algorithms described herein before then in step 700 an instruction is passed from a controller which may be implemented as hardware, or as system software held in a memory such as a read only memory (ROM) to a driving mechanism of the data storage device to reposition the read head on the data storage medium at a beginning of a data set to be re-read or at an end of a data set. Preferably, a data set may be re-read in a forward pass of the data storage medium past a read head or in a reverse pass of the data storage medium past the read head. The read head traverses between first and second ends of the logical data set as stored on the data storage medium. Preferably, the data storage medium may be a magnetic tape data storage medium. However, it will be understood by those skilled in the art that the invention is not limited to data storage devices including a magnetic tape data storage medium.

In step 700, codeword pairs are re-read from the data storage medium. In step 710, the codeword pairs read in the original read operation and stored in the buffer memory are checked by accessing the codeword pair status bytes stored in a logically distinct location within the buffer memory.

During the re-read operation, a codeword pair is read from the data storage medium and the header information stored in CCP header data is recovered. In step 720, the status data indicate whether a codeword pair was recovered and the number of bytes in error that were corrected using the C1 decoding algorithm. The number of bytes corrected during the C1 redundancy decoding of a codeword pair is known herein as a C1 redundancy decoding quality metric. If it is identified that a codeword pair read from the data storage medium during a re-read operation has fewer bytes in error than a same codeword pair stored within the buffer resulting from an earlier read operation then the most recent version of the codeword pair is written over the earlier version within the buffer memory. Similarly, if a codeword pair is read from the data storage medium during a re-read operation and decoded using the C1 decoding algorithm as described herein before and a corresponding codeword pair having a same codeword identifier was not recovered during a previous read operation then the decoded codeword pair is written into the buffer memory at the location determined by its respective codeword identifier. In this manner, C1 codeword pairs that were corrupted or otherwise missing during a first read operation of those codeword pairs are subsequently overwritten with correctly decoded versions of a same codeword pair during a re-read operation. In step 730, a logical location of correctly C2 decoded sub data sets within a data set are stored within a region of memory known herein as a sub data set mask. Those sub data sets stored within a sub data set mask are preserved in subsequent re-read operations and are not written over. In step 740, having completed a re-read operation the C2 redundancy encoding is repeated. If, in step 750, an entire data set is recoverable because the number of corrupted bytes of data within a single column of a sub data set, as illustrated in FIG. 2, is less than the maximum number of corrupted bytes that the C2 redundancy encoding algorithm can recover and all of the sub data sets comprising a data set can be correctly recovered from the redundancy data encoded within each sub data set then, in step 760, the data storage device returns to a normal read operation and commences reading a next data set. If there are insufficient uncorrupted codeword pairs to enable the C2 decoding algorithm to recover all of the plurality of sub data sets comprising a data set then, according to the best mode presented herein, step 700 and the subsequent steps are repeated. In this manner, by repeated re-read operations on a data set progressively more corrupted codeword pairs are overwritten with correctly read versions of the same codeword pairs whilst preserving correctly read codeword pairs until the C2 redundancy decoding algorithm can function correctly at which point the recovery algorithm terminates, a complete data set is passed to the user and a read operation commences on a next data set.

Figure 8:
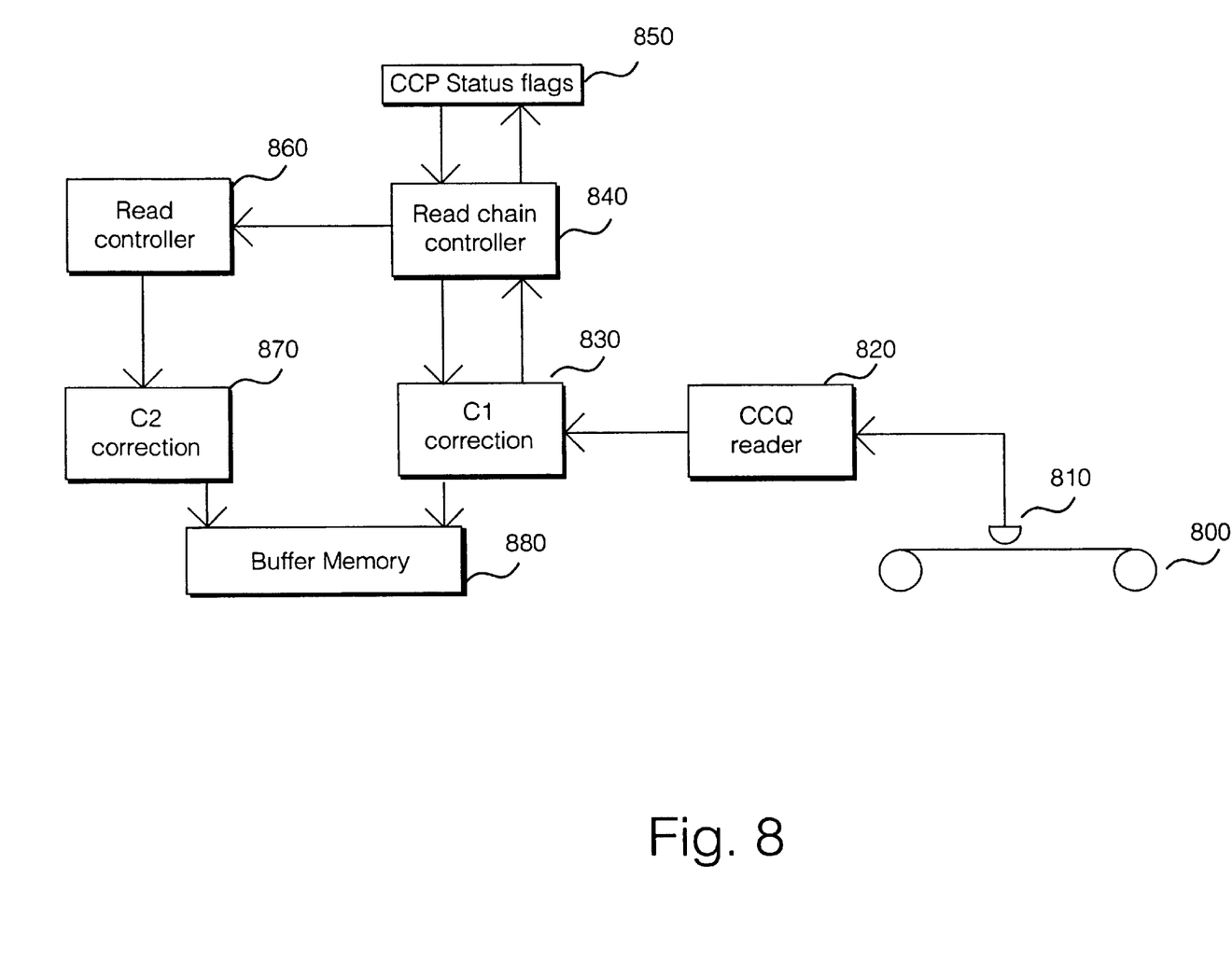
FIG. 8 illustrates schematically an apparatus for recovering and replacing corrupted codeword pairs during a read operation by a data storage device from a data storage medium according to a specific embodiment of the present invention.

Referring to FIG. 8 herein, there is illustrated schematically a data storage device configurable to preserve correctly read codeword pairs within a buffer memory according to a preferred embodiment of the present invention. Data storage medium 800 may be a magnetic tape data storage medium which is configurable to contain codeword pairs encoded with two levels of redundancy encoding data during a write operation to store user data from a first device, eg a computer, during a back up. The data storage device is also configurable to read the codeword pairs from the data storage medium during a read operation and a re-read operation using a read head assembly 810 which is preferably located substantially adjacent to the data storage medium 800. The codeword pairs read from the data storage medium 800 are processed by a reading means which is also known herein as a codeword quad (CCQ) reader 820. The term codeword quad as used herein refers to a concatenated pair of codeword pairs. The codeword quad reader 820 is configurable to detect codeword pairs read from the data storage medium and to recover CCP header data 400. During a read operation or re-read operation a codeword pair that has a correctly recovered CCP header data 400 is passed to a first redundancy decoding means 830. The first redundancy decoding means 830 is, preferably, configured to decode codeword pairs encoded with a C1 ECC redundancy encoding algorithm as described herein before.

The recovered CCP header data 400 passed to read chain controller 840.

If the C1 codeword pair whose header data has been passed to read chain controller 840 has been correctly decoded then the read chain controller instructs C1 correction block 830 to store the recovered C1 codeword pair in buffer memory 880. Read chain controller 840 is configured to attempt to construct complete data sets from recovered codeword pairs read from tape 800 during a read operation or during a subsequent reread operation. The location of a correctly recovered codeword pair within buffer memory 880 is determined by the codeword identifier data and data set number stored within the corresponding respective codeword pair header data 400. Additionally, the read chain controller has access to another region of memory which is known as CCP status flags 850. The CCP status flags 850 store corresponding respective data for each codeword pair of the plurality of codeword pairs comprising a data set indicating whether or not the corresponding respective codeword pair has been successfully read from tape and C1 decoded. During a read operation or a re-read operation, read chain controller 840 checks each codeword pair within a data set. When every codeword pair within a data set has been read from the data storage medium 800 then read chain controller 840 instructs read controller 860 that all codeword pairs comprising a single data set have been read irrespective of whether individual codeword pairs have been correctly C1 decoded or not. When read controller 860 has received the instruction that an end of data set has been reached then the read controller instructs C2 correction block 870 to attempt to perform C2 correction on codeword pairs stored within buffer memory 880. After C2 correction block 870 has attempted to perform C2 redundancy decoding on the contents of buffer 880 then the C2 correction block notifies read controller 860 with an indication as to whether each of the 16 sub data set comprising the data set had been successfully C2 decoded. If each sub data set has passed C2 correction then the data is passed for further processing before being sent to the user. However, if at least one of the sub data sets fails C2 correction then read controller 860 issues instructions to the data storage device drive mechanism to re-read the region of the data storage medium containing the current data set. Instructions from the read controller 860 to the drive mechanism may comprise instructions to reposition the data storage medium with respect to a read head 810 such that the read head is positioned at the start of a data set. Instructions from read controller 860 to the drive mechanism may also comprise instructions to commence reading the tape in a reverse direction to that in which the data set, currently stored in buffer memory 880, was read. In response to an indication from C2 correction block 870 to read controller 860 that at least one sub data set has failed C2 correction then read controller 860 invokes a recovery algorithm according to the best mode presented herein.

Figure 9:
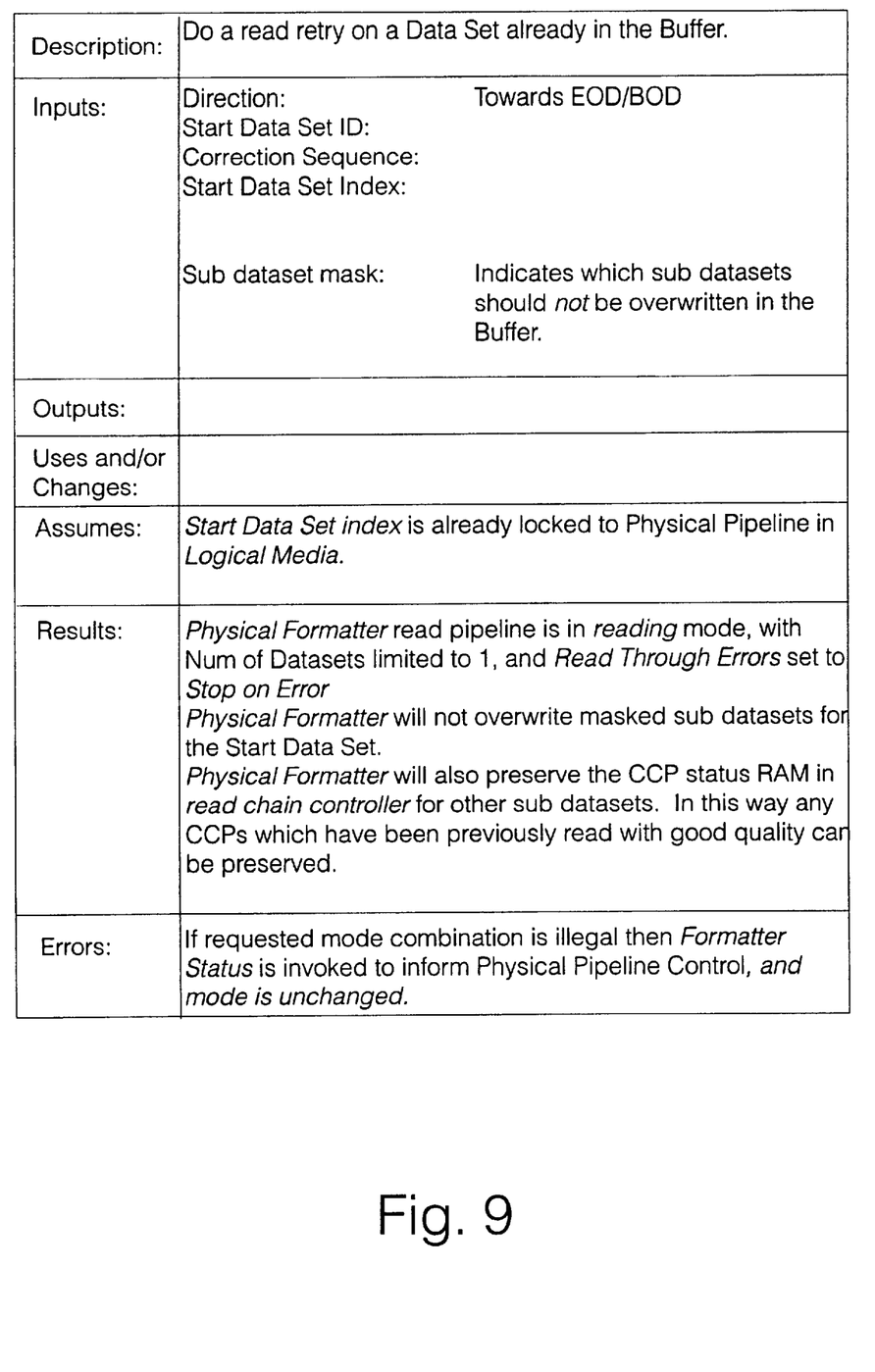
FIG. 9 illustrates schematically an overview of the steps involved in recovering corrupted codeword pairs according to a specific implementation of the present invention.

Referring to FIG. 9 herein, there are illustrated schematically the process steps involved in a read retry of a data set which has previously been read. In a previous read operation to read a data set, those sub data sets which were successfully decoded using a first and second redundancy decoding algorithms as described herein above are indicated by a sub data set mask.

The high level steps involved in using the data recovery algorithm during a re-read operation which is also known herein as a read retry operation are as follows:

A data set is read during a normal read operation and, as described herein before, CCP head and status information are recovered and C1 and C2 decoding attempted. If the C2 decoding of at least one sub data set comprising the data set fails then, according to the best mode described herein, a re-read operation is initiated;

A re-read operation is started in which a data set previously read is re-read. The re-read operation is limited to the corresponding data set on the data storage medium whose counterpart stored in buffer memory 880 has just failed C2 decoding. Other data sets simultaneously stored within buffer memory 880 are not re-read during a re-read operation. During the re-read operation the hard ware and soft ware are set up to overlay in buffer memory 880 incorrectly read codeword pairs from the previous read operation contained within sub data sets which failed C2 redundancy decoding;

These steps of re-reading a data set and overlaying incorrectly read codeword pairs from a previous read operation are repeated until all sub data sets within a data set are correctable using the C2 redundancy decoding algorithm. The operations of re-reading and overlaying may continue indefinitely until all sub data sets within a data set are correctly decoded or, preferably, a different recovery algorithm may be invoked after a pre-determined number of re-read operations on a given data set.

Figure 10:
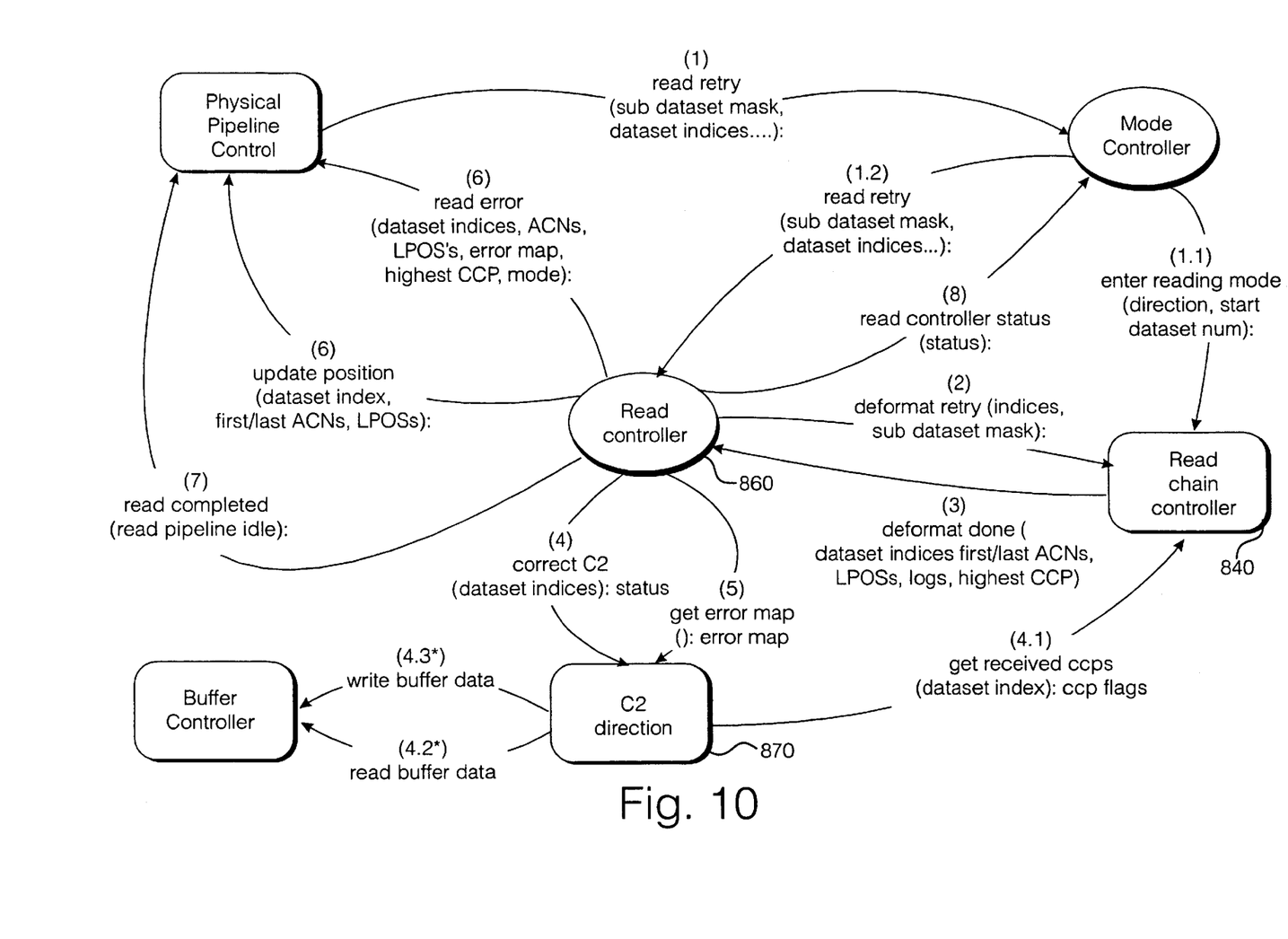
FIG. 10 illustrates schematically a mode of operation of a data storage device configured to re-read corrupted codeword pairs according to a specific method and embodiment of the present invention.

Referring to FIG. 10 herein, there is illustrated schematically the set of operations performed by the sub-elements of the apparatus illustrated in FIG. 8 during a re-read operation. Arrows indicate the direction in which an instruction is passed from one sub-element to another and the order in which said instructions are passed is indicated by a number in brackets above each operation. If at least one sub data set has failed C2 correction then read controller 860 issues a de-format retry command to read chain controller 840. During a de-format retry those data sets which were successfully decoded using the C2 redundancy decoding algorithm are preserved within buffer memory 880 and no codeword pairs of the preserved sub data sets are overwritten during the re-read operation. The sub data set mask is a set of memory locations within a random access memory which store data indicating whether or not each sub data set within a data set have been correctly decoded using the C2 redundancy decoding algorithm. During the re-read operation read chain controller 840 stores C1 decoded codeword pairs in buffer memory, overwriting older versions of the corresponding respective codeword pairs, with the restriction that a re-read codeword pair is not contained within a sub data set which has previously been successfully C2 decoded as indicated by the sub data set mask. When all of the codeword pairs required to complete the sub data sets which have previously failed C2 redundancy correction have been re-read then read chain controller 840 issues a de-format done instruction to read controller 860. Read controller 860 then instructs C2 block 870 to attempt C2 correction on sub data sets within buffer memory 880 which have previously failed C2 correction. If C2 correction again fails on any sub data sets an error map is generated by read controller 860 which then issues another de-format retry instruction to read chain controller 840.

What is claimed is:

1. A method of recovering data written onto a data storage mediun as a plurality of encoded data fragments said method comprising the steps of:

performing a first read operation to read at least one encoded data fragment of said plurality of encoded data fragments from said data storage medium;

storing a first status data indicating whether said at least one data fragment has been correctly read;

if said at least one data fragment is correctly read, writing said at least one read data fragment to a buffer memory;

attempting to decode said at least one encoded data fragment in said buffer memory;

if said attempted decoding is unsuccessful, performing a second read operation resulting in re-reading said at least one encoded data fragment from said data storage medium;

attempting to decode said re-read encoded data fragment; and if said re-read data fragment has fewer bytes in error than said at least one encoded data fragment, overwriting said at least one encoded data fragment with said tread encoded data fragment.

2. The method as claimed in claim 1, wherein in said step of writing said at least one data fragment to buffer memory, only said data fragments for which a header data is successfully recovered are written into said buffer memory.

3. The method as claimed in claim 1, wherein said status data;

indicates that a C1 codeword pair has been read; and identifies a number of corrupted bytes of data corrected by a C1 decoding algorithm.

4. The method as claimed in claim 1, wherein said step of re-reading said at least one incorrectly read encoded data fragment comprises:

repositioning a read head at one end of a data set containing at least one incorrectly read encoded data fragment to be re-read; and re-reading said data set by traversing said read head between first and second ends of said data set.

5. The method as claimed in claim 1, further comprising the step of:

using redundancy coding data in said at least one data fragment to confirm that a header field data has been correctly read during a said read operation.

6. The method as claimed in claim 1, further comprising the steps of:

generating a second status data indicating whether said at least one data fragment is correctly read during said second read operation;

comparing said second status data with said first status data to determine whether the re-read said at least one data fragment has fewer error bytes than corresponding respective said data fragments stored in said buffer memory; and if said re-read at least one data fragment has fewer error bytes than said stored data fragment, storing said re-read data fragment in said buffer memory.

7. The method as claimed in claim 6, wherein said step of storing said re-read data fragment comprises overwriting said initial stored data fragment from said first read operation with said re-read data fragment from said second read operation.

8. The method as claimed in claim 1, further including:

writing said data fragment read in said second read operation to a location in said buffer memory determined by said header identifier data in response to a data fragment read during a said second read operation having a header identifier data which is not the same as a header identifier data of a said data fragment already written to said buffer memory in said first read operation.

9. The method as claimed in claim 1, wherein said step of attempting to decode said at least one encoded data fragment in said buffer memory comprises applying a redundancy decoding algorithm to said at least one encoded data fragment in said buffer memory.

10. The method as claimed in claim 1, wherein said plurality of encoded data fragments are stored in said buffer memory as a plurality of sub-data sets, said plurality of sub data sets comprising a data set.

11. The method as claimed in claim 1, wherein said at least one encoded data fragment is a codeword pair.

12. A processor for performing the steps of claim 1.

13. A memory storing a program for causing a processor to perform the method of claim 1.

14. A data storage device configurable to read at least one encoded data fragment from a data storage medium, characterized by comprising:

a means for reading said encoded data fragments from said data storage medium;

a means for applying at least one decoding algorithm to said encoded data fragments;

a first memory area configurable to store status data concerning decoding quality metrics of said encoded data fragments; and a second memory area configurable to store decoded said data fragments;

said data storage device being arranged to operate to recover data written on said data storage medium as a plurality of encoded data fragments by:

performing a first read operation to read at least one encoded data fragment of said plurality of encoded data fragments from said data storage medium;

storing a first status data indicating whether said at least one data fragment has been correctly read;

if said at least one data fragment is correctly read, writing said at least one read data fragment to said second memory area;

attempting to decode said at least one encoded data fragment in said second memory area;

if said attempted decoding is unsuccessful, performing a second read operation for re-reading said at least one encoded data fragment from said data storage medium;

attempting to decode said re-read encoded data fragment; and if said re-read data fragment his fewer bytes in error than said at least one encoded data fragment, overwriting said at least one encoded data fragment in said second memory area with said re-read encoded data fragment.

15. A data storage device as claimed in claim 14, wherein said reading means comprises:

a transducer configurable to convert data written onto said data storage medium into electronic signals; and a means for recovering data from said read data fragments indicating a logical position of said at least one read fragment within said plurality of fragments.

16. A data storage device as claimed in claim 15, wherein said means for applying a redundancy decoding algorithm is configurable to apply first and second Reed-Solomon redundancy decoding algorithms.

17. A method of recovering a data set written to a data storage medium as a first plurality of encoded data fragments said method comprising the steps of:

performing a read operation of said data set to read at least one of said plurality of encoded data fragments comprising said data set;

storing said read at least one data fragment in an area of a buffer memory reserved for storing data fragments of said data set;

storing in a memory device a quality metric data of said read operation of said at least one data fragment;

decoding said data set comprising said plurality of fragments stored within said buffer memory;

if said step of decoding said data set within said buffer memory fails, performing a re-read operation to re-read incorrectly read data fragments of said data set from said data storage medium; and if said re-read data fragment has fewer bytes in error than said at least one data fragment, overwriting said at least one data fragment with said re-read data fragment in said buffer memory.

18. The method as claimed in claim 17, wherein said at least one encoded data fragment is a redundancy encoded codeword pair.

19. The method as claimed in claim 17, wherein said data set comprises a plurality of error correction code redundancy coded sub data sets.

20. The method as claimed in claim 17, wherein said step of decoding said data set within said buffer memory comprises:

applying an error correction code redundancy decoding algorithm to each sub data set of a plurality of sub data sets comprising a said a data set; and storing within a memory device, location data indicating which sub data sets of said plurality of sub data sets have been successfully decoded.

21. The method as claimed in claim 17, wherein said error correction code redundancy decoding algorithm is a Reed-Solomon redundancy decoding algorithm.

22. The method as claimed in claim 17, wherein said step of performing a re-read operation comprises:

re-reading at least one incorrectly read data fragment; and overwriting said at least one re-read data fragment over corresponding respective earlier versions of at least one said data fragment stored in said buffer memory.

23. The method as claimed in claim 17, further comprising the step of:

storing a location data describing memory locations of a plurality of correctly decoded sub data sets comprising said data set, wherein said correctly decoded sub data sets are preserved from overwrite in said buffer memory.

24. The method as claimed in claim 17, further comprising:

repeating said re-read operation on said data set a predetermined number of times, such that correctly read versions of data fragments are overwritten over stored data fragments having errors, until a C2 redundancy decoding algorithm can function for decoding said complete data set.

25. A processor for performing the steps of claim 17.

26. A memory storing a program for causing a processor to perform the method of claim 17.

27. A method of recovering data written onto a data storage medium as a plurality of encoded data fragments, said method comprising the steps of:

reading from said data storage medium a data set comprising a plurality of codeword pairs;

checking a header parity data of each said codeword pair;

for individual said codeword pairs, decoding C1 redundancy encoding data from said codeword pair, and using said C1 redundancy data to correct one or a plurality of incorrectly read said codeword pairs;

storing in a memory, a first status data indicating a number of corrupted bytes of data corrected by said C1 redundancy coding;

applying a second redundancy decoding algorithm for decoding C2 redundancy data of a plurality of sub-data sets within said data set;

using said C2 redundancy encoded data to reconstruct missing or corrupted bytes of data in said data set; and if said C2 correction fails to fully correct said data set, then re-reading from said data storage medium individual codeword pairs from said data set, said step of re-reading individual codeword pairs comprising:

(a) reading said status data indicating whether a codeword pair was recovered and indicating a number of bytes in error in said codeword pair; and (b) if said re-read codeword pair has fewer bytes in error than said same codeword pair originally stored within said memory resulting from said earlier read operation, then overwriting said earlier codeword pair with said re-read codeword pair.

28. The method as claimed in claim 27, comprising repeating the step of re-reading said individual codeword pairs.

29. This method as claimed in claim 27, wherein data indicating whether or not a codeword pair has been successfully read from tape and C1 decoded is stored as a second status data.

30. A processor for performing the steps of claim 7.

31. A memory storing a program for causing a processor to perform the method of claim 7.

32. A data storage device configurable to read at least one encoded data fragment from a data storage medium, comprising:

a reader of said encoded data fragments from said data storage medium;

a source of at least one decoding algorithm to said encoded data fragments;

a first memory area configurable to store status data concerning decoding quality metrics of said encoded data fragments; and a second memory area configurable to store decoded said data fragments;

said data storage device being arranged to operate to recover data written on said data storage medium as a plurality of encoded data fragments by:

performing a first read operation to read at least one encoded data fragment of said plurality of encoded data fragments from said data storage medium;

storing a first status data indicating whether said at least one data fragment has been correctly read;

if said at least one data fragment is correctly read, writing said at least one read data fragment to said second memory area;

attempting to decode said at least one encoded data fragment in said second memory area;

if said attempted decoding is unsuccessful, performing a second read operation for re-reading said at least one encoded data fragment from said data storage medium;

attempting to decode said re-read encoded data fragment; and if said re-read data fragment has fewer bytes in error than said at least one encoded data fragment, overwriting said at least one encoded data fragment in said second memory area with said re-read encoded data fragment.

33. A data storage device as claimed in claim 32, wherein said reader comprises:

a transducer configurable to convert data written onto said data storage medium into electronic signals; and a processor for recovering data from said read data fragments indicating a logical position of said at least one read fragment within said plurality of fragments.

34. A data storage device as claimed in claim 33, wherein said processor for applying a redundancy decoding algorithm is configurable to apply first and second Reed-Solomon redundancy decoding algorithms.

* * * * *